Figure 1:
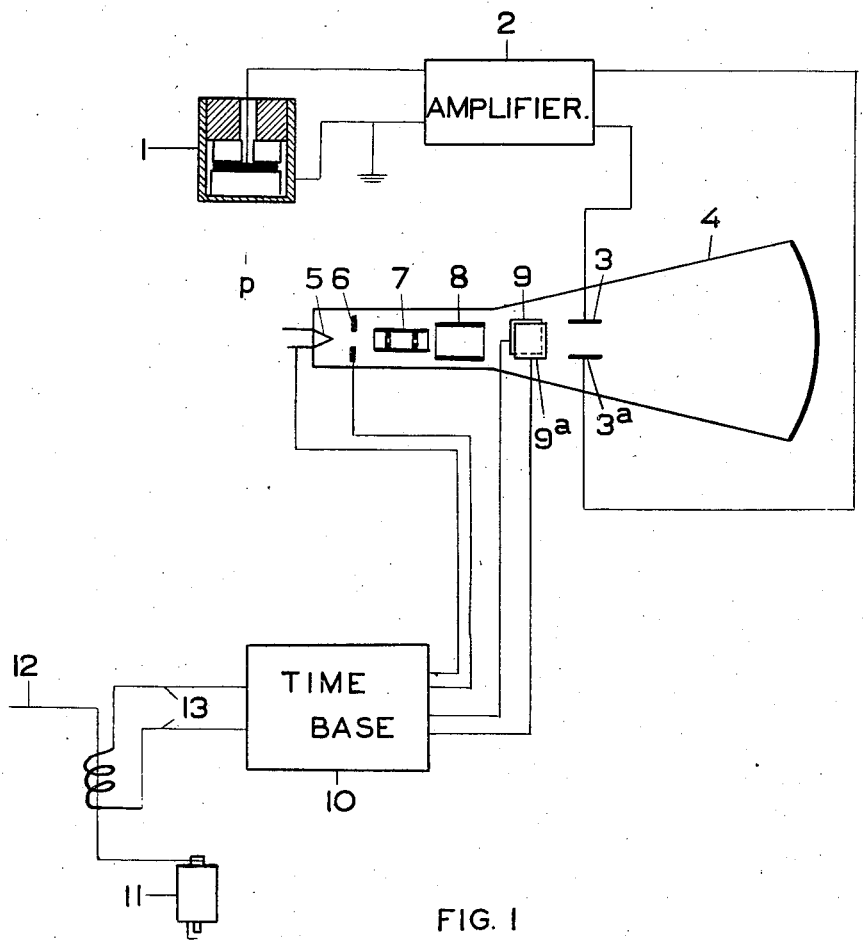

Patented Dec. 17, 1940

2,225,381

UNITED STATES PATENT OFFICE 2,225,381

ELECTRIC PRESSURE INDICATOR FOR INTERNAL COMBUSTION ENGINES

Willem Johannes Dominicus van Dijck, The Hague, Netherlands

Application March 30, 1938, Serial No. 198,982
In the Netherlands March 31, 1937

2 Claims. (Cl. 73—30)

The invention relates to electric pressure indicators for internal combustion engines and more particularly to the controlling of the time base of such an indicator.

For measuring rapidly varying pressures such as those occurring in the cylinders of internal combustion engines the possibility of converting directly and with very little inertia pressures and/or variations in pressure into electric phenomena is being more and more utilized at present. As is known, such electric phenomena can be readily recorded or observed, so that as a result a clear image of the change in pressure is obtained.

The apparatus performing such function will be termed hereinafter "electric indicator"; that portion of the apparatus in which the mechanical effects are converted into electric effects will be termed "pressure observer," whilst the portion whereby the electric tensions and/or currents are rendered perceptible or recorded will be termed "reproducer."

As a rule the electric tensions originating from the pressure observer will have to be amplified before they can be recorded or rendered perceptible by the reproducer; consequently, in the majority of cases an amplifier will be interposed between pressure observer and reproducer.

An electric indicator also comprises a so-called "time base," the object and operation of which will become evident from the following. The electric tensions originating from the amplifier will effect a deflection of the movable system of the reproducer. Thus the cathode ray in a cathode-ray tube will undergo a deflection in a definite direction, if the tension mentioned above is impressed across a set of two deflection plates so that a straight luminous line can be observed on the screen. In order to observe or record at any moment the magnitude of the electric tension it is, however, necessary that the movable system, in this case the cathode ray, is subjected to a second deflection in a direction at right angles to the first-mentioned deflection. That portion of the electric indicator which effects this deflection of the movable system of the reproducer is called the "time base."

In case the reproducer is a cathode-ray tube the "time base" provides an electric tension which is impressed across the other set of deflection plates, so that the cathode ray does not move in one definite plane, but in space. Consequently a two-dimensional figure is observed on the screen instead of a straight line. When other oscillographs (e. g. loop-oscillographs) are used there is often present a second movable system, which owing to the electric tension from the time base undergoes a deflection at right angles to the direction of deflection of the first movable system. A ray of light, which is reflected at a reflecting surface of each of the two systems, then describes a figure on the screen. In case a rotating mirror (or a set of rotating mirrors) or a sensitive plate for photographic recording is used the driving mechanism of the rotating mirror or the disengaging and/or driving mechanism of the sensitive plate is to be regarded as the time base.

In order to explain more easily the operation of the connection in accordance with the invention the following will be confined to a time base used in connection with a cathode-ray oscillograph; this does not mean, however, that an arrangement in accordance with the invention can be used only for cathode-ray oscillographs.

Two kinds of time bases for electric indicators are known: the first kind is that in which a tension is continuously set up via a member coupled to the engine, which tension depends, for instance, on the position of the crank shaft (consequently on the crank angle) or of the piston.

The second kind of time base is that in which a tension is set up the magnitude of which varies with time, independently of the engine. The desired tension can be taken, for example, from a condenser which is charged or discharged. The rate at which the tension increases or decreases depends in this case entirely on electric magnitudes, such as capacity of the condenser, resistance, etc.

One or more times per stroke or one time per a number of strokes a member which in some way is connected to the engine interferes with the time base, whereby each time a definite moment is fixed at which charging and/or discharging of the condenser commences. Consequently the time base is controlled by the engine, i. e., the time base is put into or out of operation by the engine.

A known construction of the second kind of time base consists of a condenser which is charged by a battery via a resistance, whilst at a predetermined position of the crank shaft, e. g., 90° before the dead centre, the condenser is short-circuited for a moment, after which charging commences.

The rate of increase of the tension of the condenser therefore depends on the capacity of the condenser, on the magnitude of the resistance and on the tension of the battery and does not depend on the speed of the engine, on the position of the crank shaft, etc. The moment at which charging commences or is interrupted (i. e., when the condenser is short-circuited for a moment) is, however, controlled by the engine. It is not necessary that the cathode ray owing to the action of the time base commences to move at the same moment at which charging of the condenser begins; it is quite possible to make such arrangements that the cathode ray does not move until the tension of the condenser has reached a predetermined, preferably adjustable value.

In general it may be said, therefore, that a time base of the second type imparts a rate of deflection to the movable system of the reproducer which can be regulated independently of the engine and that the controlling of the starting point of this type of time base (i. e., putting it into or out of operation) is regulated by the engine.

It was found that controlling of such a time base of the second type can advantageously be effected dependent on a phenomenon which initiates and/or causes combustion. According to the invention the "natural zero point" of the combustion is thus selected as a starting point for recording and/or observing the indicator diagram. In the case of an engine with spark ignition the instant of ignition by the spark comes into consideration, whereas in the case of an engine with fuel injection this point is determined, for instance, by the fuel pump motion, the needle-lifting motion or by the pressure rise in the fuel injection line.

Such a manner of controlling the time base is quite distinct from a manner in which the time base, constituted of an oscillator, e. g., a relaxation oscillator, having a period of its own, is controlled by synchronizing it with the recurrent phenomena in the engine cylinder. In the latter case synchronizing—and as a result a satisfactory operation—will be possible only when the frequency of the time base oscillator and of the recurrent cylinder phenomena do not diverge too widely, so that for different engine speeds the time base requires different adjustments, each serving for a limited range of speed only.

According to the invention a time base is chosen which, having no period of its own, may be called aperiodic and has to be started each time anew when a combustion takes place in the cylinder under test. Consequently such a time base can be used with any engine speed from zero up to maximum without any adjustment.

According to the invention the arrangement for a spark ignition engine can be very simple. The time base is, for instance, inductively coupled with the supply line to the spark plug of the combustion space to be tested.

The advantages of this method of controlling the time base over those already known are the following:

The chief object of the tests on internal combustion engines in which an electric indicator is used generally is the examination of the combustion process in the cylinder; for this reason it is advantageous to select the zero point of the combustion as starting point for the diagram. With the hitherto known methods of controlling, however, controlling took place by a contact on the engine shaft, in other words the controlling was dependent on a definite position of the crank shaft or of the piston. It is known, however, that successive combustions in one and the same combustion space do not occur precisely at the same position of the crank or piston, even under exactly the same conditions. With the known methods of controlling the result is that nearly the whole diagram vibrates continuously, whereby recording and especially observation is seriously hampered. By rendering the method of controlling dependent on the moment at which the spark is produced, the fuel is injected, etc., this tolerance in the lapse between the moment at which the time base is put into operation and the moment at which combustion occurs is eliminated, so that a considerably steadier diagram free from vibrations is obtained.

Further the apparatus involved is simpler, easier of access and can more readily be installed than the corresponding apparatus of already known construction.

Especially in the case of spark ignition gasoline engines the provision of an inductive coupling of the time base with the spark plug cable is very easy; this advantage is particularly apparent when airplane engines during flight or motor cars on the road are to be tested. But even in the case of stationary engines it is much easier to provide a time base control contact, for instance, at the fuel pump or an inductive coupling with the spark plug cable than to provide a contact at the engine shaft, where the same is generally difficult of access.

Figure 2:
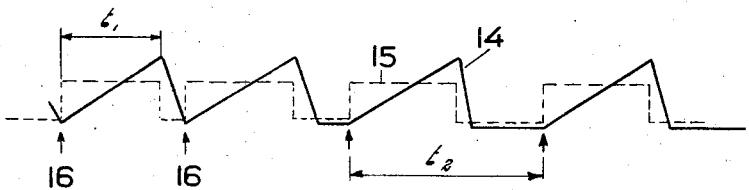

An arrangement according to the invention to be used in connection with spark ignition engines is shown diagrammatically in Figure 1 of the annexed drawing, whilst Figure 2 explains the operation of the time base.

In Figure 1 the numeral 1 indicates the pressure observer, such as a piezo-electric crystal observer arranged in the wall of the cylinder of the engine under test and exposed to the pressure P to be investigated. The voltage generated by the pressure observer is fed to the amplifier 2, the output voltage of which is impressed across the deflection plates 3 and 3a of the cathode ray oscillograph 4, so as to cause a deflection of the beam of electrons, emitted by the cathode 5, in a vertical direction.

The cathode-ray tube further comprises a control grid 6, serving to control the rate at which electrons are emitted by the cathode 5, anodes 7 and 8 condensing the cathode rays and a second pair of deflection plates 9 and 9a for deflecting the beam in a direction perpendicular to the direction of the deflection to be obtained by means of the plates 3 and 3a. The plates 9 and 9a are connected to the output side of the time base 10, and so are the cathode 5 and control grid 6.

The usual connections for giving the desired potential to the anodes 7 and 8, for heating the cathode, etc. are not indicated in the drawing. The input side of the time base is connected to a circuit 13, which is inductively coupled to the supply line 12 to the spark plug 11, mounted in the wall of the same cylinder as the pressure observer 1, so that on a current flowing through the line 12 at the moment of the spark the time base is put into operation. The action of the time base is such as shown in Figure 2, in which the line 14 indicates the potential difference impressed across the deflection plates 9, 9a as a function of time, whereas the dotted line 15 indicates the potential difference between the cathode 5 and the control grid 6, controlling the intensity of the emission of electrons.

Arrows 16 indicate the moments at which the supply line 12 to the spark plug 11 is fed with current. At such moments the potential difference across plates 9, 9a begins gradually to increase, until after the time $t_1$ it suddenly drops. During the same time $t_1$ the potential of grid 6 as compared to that of cathode 5 is raised so as to stimulate the emission of electrons for obtaining a beam which will produce a sufficiently bright spot on the screen of the tube.

From Figure 2 it will be seen that the time $t_2$ which elapses between two consecutive sparks is fully arbitrary, in other words the time base has no period of its own.

The circuit 13 at the input side of the time base may be replaced by another type of circuit. If, for example, the arrangement is to be used with liquid fuel injection engines, the circuit 13 may comprise, instead of an induction coil, a contact which is opened or closed by the injection pump motion or any motion depending on a pressure rise within the fuel line. Such modifications will be obvious to those skilled in the art.

What I claim is:

1. An electric pressure indicator for an ignition engine cylinder comprising a pressure observer capable of converting cylinder pressures into electric impulses, an aperiodic time base circuit capable of supplying varying electric tensions, a cathode-ray oscillograph having deflecting means electrically connected to the pressure observer and deflecting means electrically connected to the time base circuit, said first means being adapted to deflect the cathode ray in response to impulses from the observer, and said second means being adapted to deflect the cathode ray at right angles to said first deflection in response to electric tension variations in the time base, and an inductive coupling between the time base circuit and the ignition circuit of the cylinder adapted to initiate an electric tension variation in the time circuit when an ignition impulse is passed to the cylinder.

2. An electric pressure indicator for an ignition engine cylinder, comprising an electrical ignition circuit for periodically firing said cylinder, a pressure observer capable of converting cylinder pressures into electric impulses, an aperiodic time base circuit capable of supplying varying electric tensions, a cathode-ray oscillograph having deflecting means electrically connected to the pressure observer and deflecting means electrically connected to the time base circuit, said first means being adapted to deflect the cathode ray in response to impulses from the observer, and said second means being adapted to deflect the cathode ray at right angles to said first deflection in response to electric tension variations in the time base, and electrical relay means responsive to firing electric impulses periodically passing in the ignition circuit for synchronizing the electric tension variation in the time base circuit with the combustion in the cylinder.

WILLEM JOHANNES DOMINICUS van DIJCK.